UNITED STATES PATENT OFFICE.

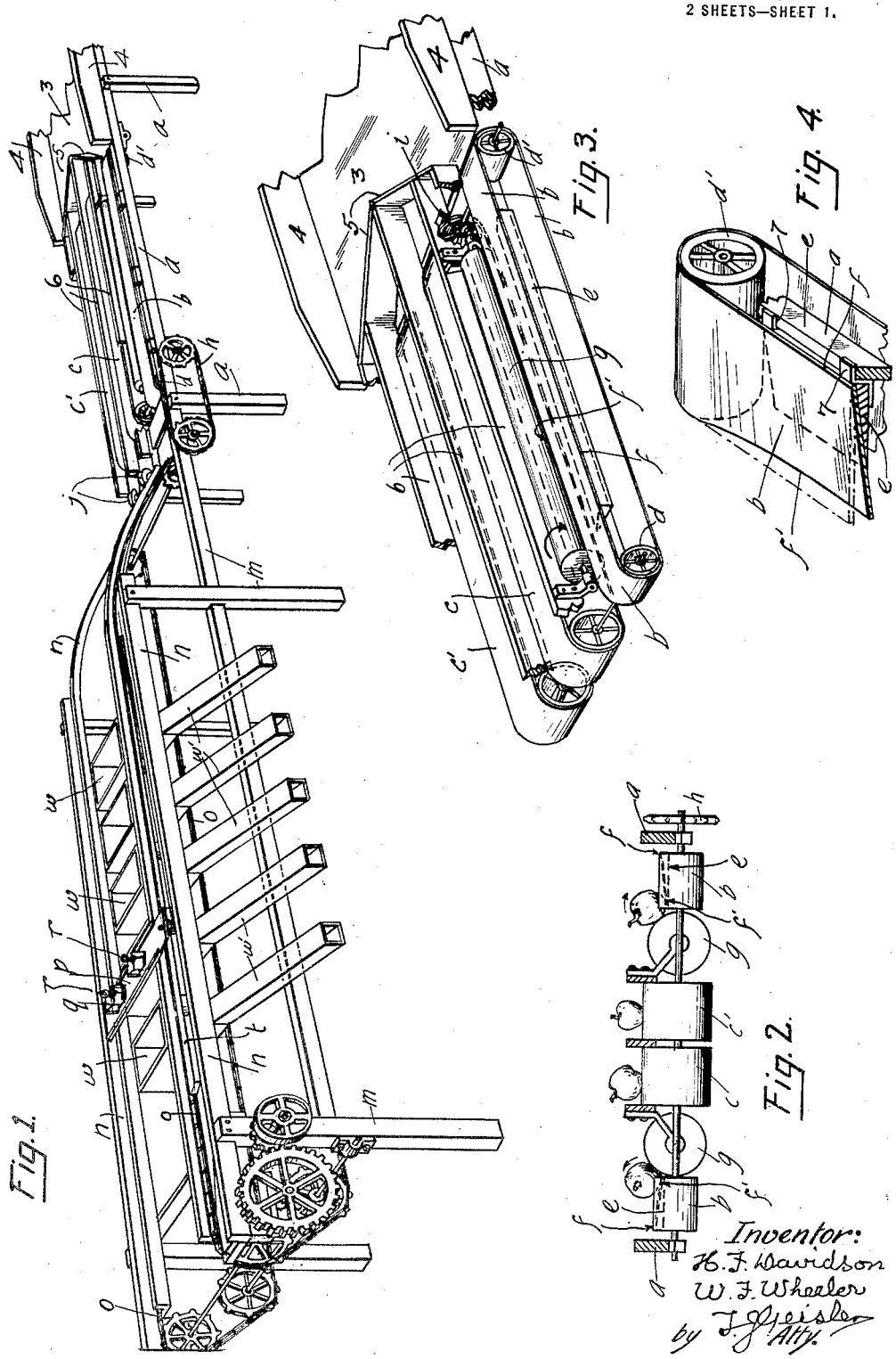

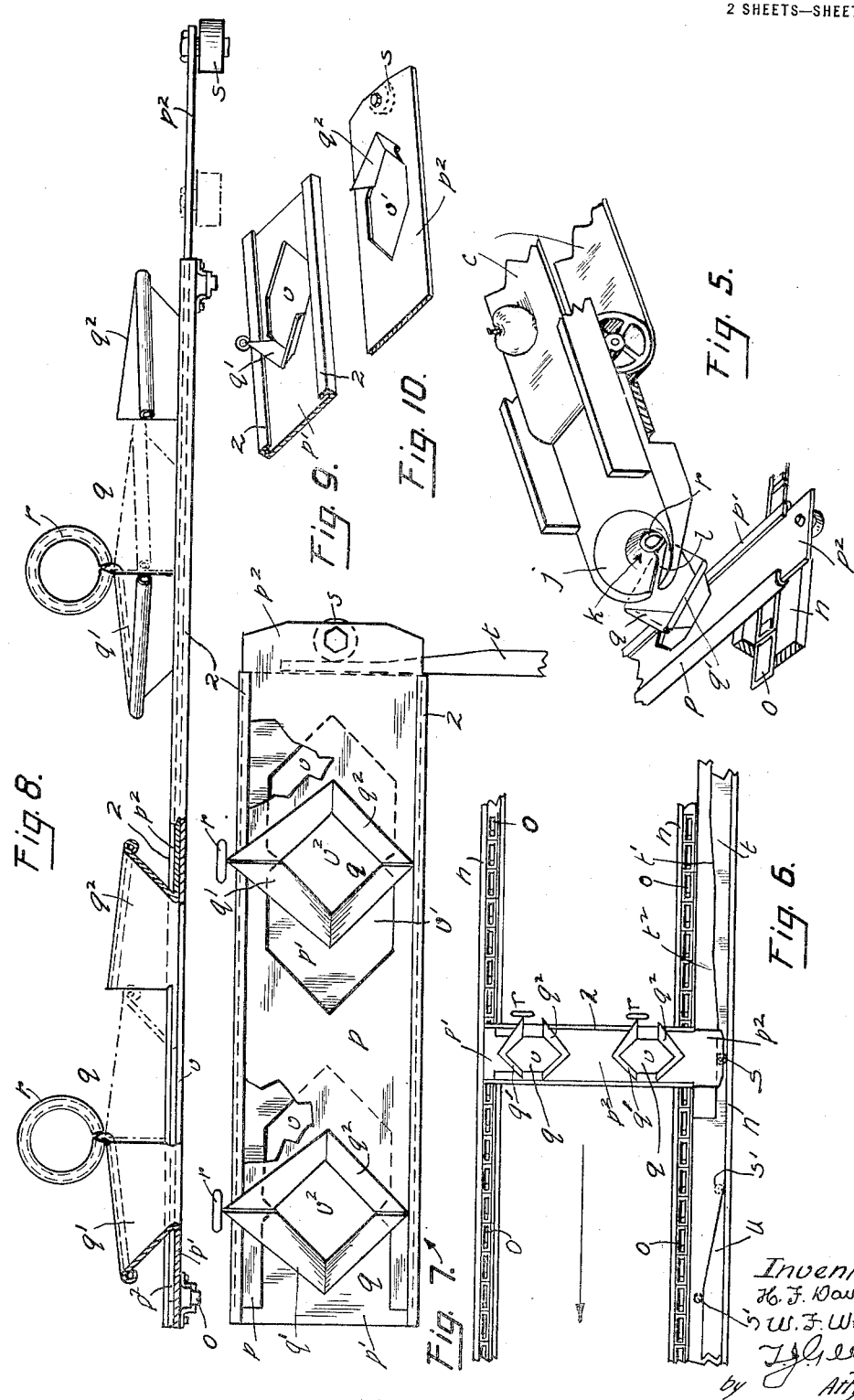

HORATIO F. DAVIDSON AND WILLIAM F. WHEELER, OF HOOD RIVER, OREGON.

FRUIT-GRADING MACHINE.

1,358,061.   Specification of Letters Patent.   Patented Nov. 9, 1920.

Application filed July 25, 1919. Serial No. 313,368.

*To all whom it may concern:*

Be it known that we, HORATIO F. DAVIDSON and WILLIAM F. WHEELER, citizens of the United States, and residents of Hood River, county of Hood, State of Oregon, have invented a new and useful Improvement in Fruit-Grading Machines, of which the following is a specification.

The object of our invention is to provide a fruit grading machine, possessing the following features:

1. An automatic grader comprising a plurality of individual cup-like grading elements open at the bottom, and the sides of which are automatically moved apart, step by step, so that first the smallest size fruit, then the medium or intermediate size fruit and finally the largest size fruit will each in turn be dropped into one of a series of receptacles over which the grading cups are automatically moved.

2. To provide means for carrying the fruit to the grader, such means including devices operating to turn the fruit over while in transit so as to permit inspection of all its sides, and other means automatically transferring the fruit from the carrier to the grader section; in other words placing the fruit piece by piece in the grading cups of the grader section.

The further object of our invention is to provide a simple, inexpensive, efficient automatic fruit grader, and to this end having the further special features hereinafter described.

Our machine, with respect to the part concerned with our invention, is constructed as illustrated in the accompanying drawings in which;

Figure 1 is a diagrammatic perspective of our machine showing the fruit carrier and the fruit grader sections arranged as in practice, but only one of said grading cup carriers is shown, and parts being omitted for clearness.

Fig. 2 is a transverse section of the carrier by which the fruit is carried to the grader, illustrating in particular the means provided on said carrier for turning the fruit while in transit so as to permit inspection of all sides of the fruit;

Fig. 3 is a larger scale perspective of said carrier with parts broken away illustrating the same features as illustrated in Fig. 2;

Fig. 4 is a perspective sectional detail of said carrier;

Fig. 5 is a perspective detail, with parts broken away, illustrating particularly the means for transferring the fruit from the carrier section to the grader section of our machine;

Fig. 6 is a fragmental plan, or top view, illustrating the grading section of our machine, also illustrating the means and manner in which the same is automatically operated;

Fig. 7 is a larger scaled detail of the construction and operation of the grading section of our machine, particularly of the grading cups and their carriers;

Fig. 8 is a side elevation, partly in section of the features shown in Fig. 7, but drawn on a larger scale than the latter. Figs. 7 and 8 being, for convenience in illustration, turned at right angles to the position of the same parts in Fig. 6;

And Figs. 9 and 10 are further details of construction of said grading-cup carriers.

On the frame portion $a$, are mounted parallel endless carriers or belts $b$, one on either side in order to give the machine greater capacity; and between said carriers are auxiliary parallel endless carriers or belts $c$, $c'$. Between the pulleys $d$, $d'$ of each of the carriers $b$, and under the upper section thereof, is provided a longitudinally extending support or board $e$, beveled in cross section, supporting the outer side $f$, of the belts $b$, as more clearly shown in Fig. 4, but permitting the inner side $f'$ to sag under the weight of the fruit.

Along the sagging inner side $f'$ of said carrier $b$, is located a driven-roller $g$, revolving on an axis parallel with the line of motion of the carrier $b$, and rotating toward the sagging side $f'$ of said carrier, as indicated by the arrow, thereby causing the fruit to turn over and over while being carried along on the carrier $b$, and in this way affording an opportunity for inspection of all sides of the fruit. The pulleys $d$, $d'$ are driven by a sprocket gear and chain element $h$, and the roller $g$ is driven by suitable bevel-gearing, as represented at $i$ in Fig. 3.

The fruit to be graded is picked off the carrier $b$, and placed on one of the auxiliary carriers $c$, $c'$ which are driven with the carrier $b$ as more clearly shown in Fig. 3.

In the front of each of the auxiliary carriers $c$, $c'$ is provided a fixed cup $j$, at the bottom $k$, and having a slot $l$ at one side, as shown in Fig. 4.

The grader section consists of a frame $m$, having ways $n$ over which travel parallel endless sprocket-chains $o$, as shown in Fig. 1. The sprocket-chains carry a plurality of transverse telescoping grading-cup carriers $p$, and the latter carry the expansible grading-cups $q$. The grading-cup carriers comprise two parts, as shown in Figs. 7, 8, 9 and 10, namely: a part $p'$ fastened on the sprocket chains $o$, and provided with flanges 2 at the sides, in which is slidably held the part $p^2$. The cup is provided in two parts or sides, $q'$, $q^2$, the side $q'$ being carried by the part $p'$ of said grading-cup carrier and the cup-side $q^2$ being on said movable part $p^2$ of the grading-cup carrier.

Each of the bar parts $p'$, $p^2$ has a central portion cut away, as $v$, $v'$ so as to provide an opening as at $v^2$ between the sides of the grading cup through which the fruit may drop when the sides are sufficiently spaced apart.

The side $q'$ of the grading cup is provided with a ring-like finger $r$, adapted for entering the bottom of the fixed cup $j$, and moving up in the slot $l$ thereof. The movable part $p^2$ of the grading-cup carrier $p$ is provided with a cam-roller $s$ bearing against a cam-rail $t$. Hence as the grading-cup carriers $p$, travel in the direction indicated by the arrow in Fig. 7, their movable parts $p^2$ are progressively pulled to one side by the inclined edges $t'$ and $t^2$ of the cam-rail $t$, thereby progressively moving the walls of the grading cups farther and farther apart. And in order to close again the grading cups, we provide a cam-rail $u$, arranged as shown in Fig. 7, against which the roller $s$ bears during the further travel of the transverse bar $p$, thereby causing the inward movement of the slidable part $q'$ of said grading cups, back to its initial position, and completing one cycle of operation of our machine.

Under the frame $m$ of the grader section is provided a series of receptacles $w$, to receive the fruit dropped from the grading cups, and these receptacles may be provided with chutes $w'$ for discharging the fruit into boxes.

The fruit to be graded is in the first instance deposited on the board 3 having sides 4, and provided with guide-flanges 5 distributing the fruit to both sides of the carrier. Bars 6 are provided to keep the fruit on the auxiliary carriers $c$, $c'$.

The beveled boards $e$ may be removably supported by hangers 7, as shown in Fig. 4.

Our device operates as follows:—

The fruit is deposited on the board 3 which is preferably inclined. The fruit is then distributed to both sides; workmen being stationed at both sides of our machine, and both sides working just the same. The fruit while on the carrier or belt $b$ is constantly turned over by the coöperating actions of the carrier $b$ and the brush $g$, thus giving ample opportunity for inspecting the fruit on all sides. The culls are taken off, and the good fruit is put on the auxiliary carrier $c$. By the latter it is conveyed to the fixed cup $j$, into which the individual fruit pieces roll or are pushed.

When one of the grading-cup carriers $p$ approaches the fixed cups $j$, the finger $r$ on the stationary side $q'$ of the grading cup $q$ will enter the open bottom $k$ of the fixed cup $j$, and will lift the fruit out of the fixed cup into the grading-cup; the fruit resting on the ring-like finger $r$ which moves up in the slot $l$ of the fixed cup; then, in the continued travel of the grading-cup carrier $p$, the movable side $q^2$ of the grading cups $q$ is gradually moved sidewise, by the cam roller $s$ moving on the cam $t$ as mentioned, thus opening the bottom of the grading cups more and more, step by step and causing first the smaller sized fruit, then the intermediate size, and finally the largest size fruit to fall into the receptacle $w$, from which the fruit is conveyed by the chutes 2' to the packing boxes or other receptacles.

The progressive opening of the grading-cups may be so arranged as to grade any desired number of different sizes of fruit, and the travel of the grading cups over the receptacles $w$ must of course be so timed as to cause the opening of the grading-cup, and discharge of the fruit, while the grading-cups are positioned over the receptacles $w$.

The returning of the movable sides $q^2$ of the grading cups $q$ to their initial position is accomplished by the cam $u$ as mentioned. The dotted circles $s'$ in Fig. 6 represent, diagrammatically, the travel of the cam-roller $s$, of the movable side $q^2$ of the grading cup, along the cam-rail $u$.

We claim:

1. In a fruit grader, parallel, endless, belt-like driven devices, a plurality of individual fruit grading-cup carriers mounted transversely on said driven devices, individual fruit grading-cups mounted on said carriers, such cups being open at the bottom and having a movable side, and means operating to move the movable side, step by step, and then returning same to its initial position.

2. In a fruit grader, parallel endless driven belts; a plurality of fruit grading-cup carriers mounted on said belts, said carriers comprising each two telescopable parts, individual fruit grading-cups mounted on said carriers, such cups being open at the bottom and having divided sides, one of which is carried by one of said carrier parts and the other by the other of the latter, means for moving said carrier parts outward, step by step, and then returning them to their initial positions, thereby opening and closing said grading-cups.

3. In a fruit grader, parallel endless driven belts; a plurality of fruit grading-cup carriers mounted on said belts, said carriers comprising each telescopable parts, individual fruit grading-cups mounted on said carriers, such cups being open at the bottom and having divided sides, one of which is carried by one of said carrier parts and the other by the other of the latter.

4. A fruit grading machine comprising a frame; parallel endless driven belts; a plurality of fruit grading-cup carriers transversely mounted on said belts, each of said carriers comprising a part fixed on said belts and a part slidable in said fixed part; individual fruit grading-cups mounted on said carriers, such cups being open at the bottom and having divided sides one of which is carried by said fixed part and the other by the sliding part of said carriers; a series of receptacles alined with said belts; a cam-rail on the frame and cam-rollers on the slidable part of said carriers, said cam-rail being adapted to move the slidable part of the carrier outward, step by step, and then return the same to its initial position, and to effect the latter movements progressively, and relatively to said receptacles.

5. In a fruit grading machine, a carrier section, a fixed cup located at the discharge end of such section, a grading section including a series of traveling individual fruit grading-cups, and means for transferring the fruit from said fixed cup to that one of said grading-cups adjacent thereto.

6. In a fruit grading machine, a primary carrier, a fixed cup into which the carrier discharges, said cup having a slotted side and being open at the bottom, secondary carrier provided with a grading cup open at the bottom and having a movable side, and further provided with a member adapted for passing through said slotted side of the fixed cup for lifting the fruit from the latter into the grading cup for the secondary carrier.

7. In a fruit grading machine, a primary carrier, a fixed cup into which the carrier discharges, said cup having a slotted side and being open at the bottom, secondary carrier provided with a grading cup open at the bottom and having a movable side, and further provided with a member adapted for passing through said slotted side of the fixed cup for lifting the fruit from the latter into the grading cup of the secondary carrier, and means for progressively moving the movable side of said grading cup.

8. In a fruit grading machine, a carrier section, a fixed cup located at the discharge end of such section, into which the carrier section discharges the fruit which it carries, a grading section including a series of traveling individual fruit grading-cups, and means for transferring the fruit from said fixed cup to that one of said grading-cups adjacent thereto.

HORATIO F. DAVIDSON.
WILLIAM F. WHEELER.